Patented June 20, 1944

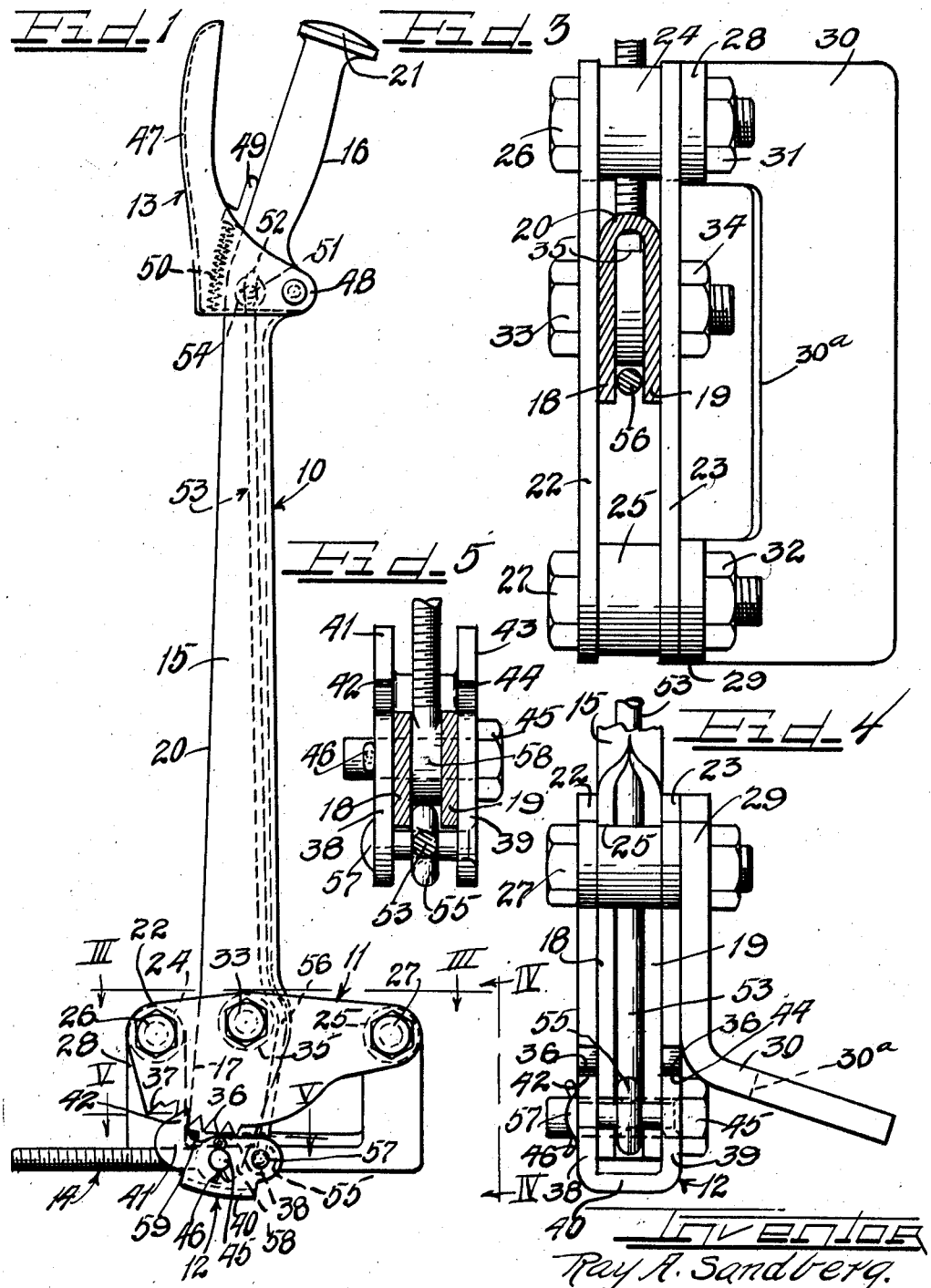

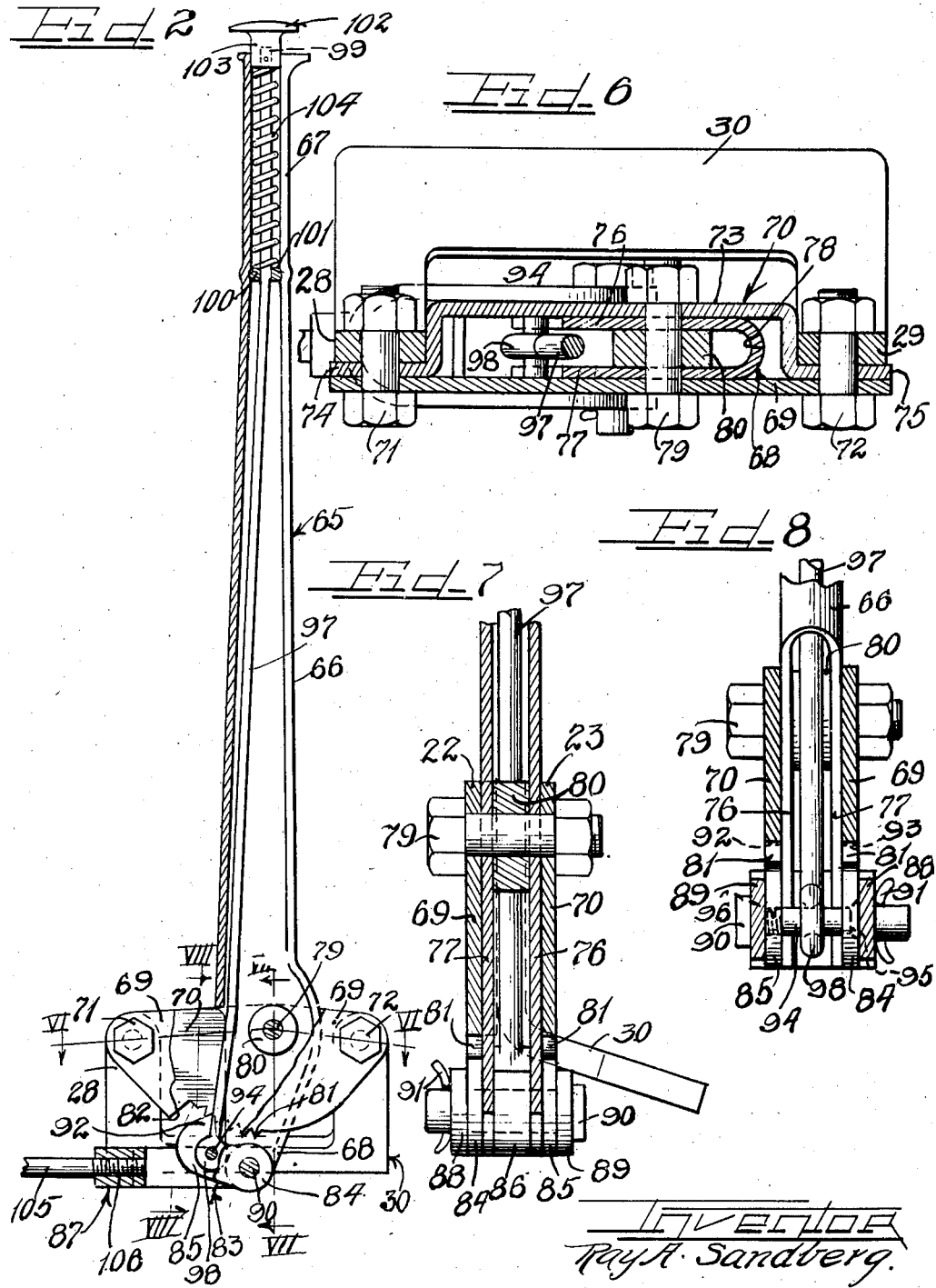

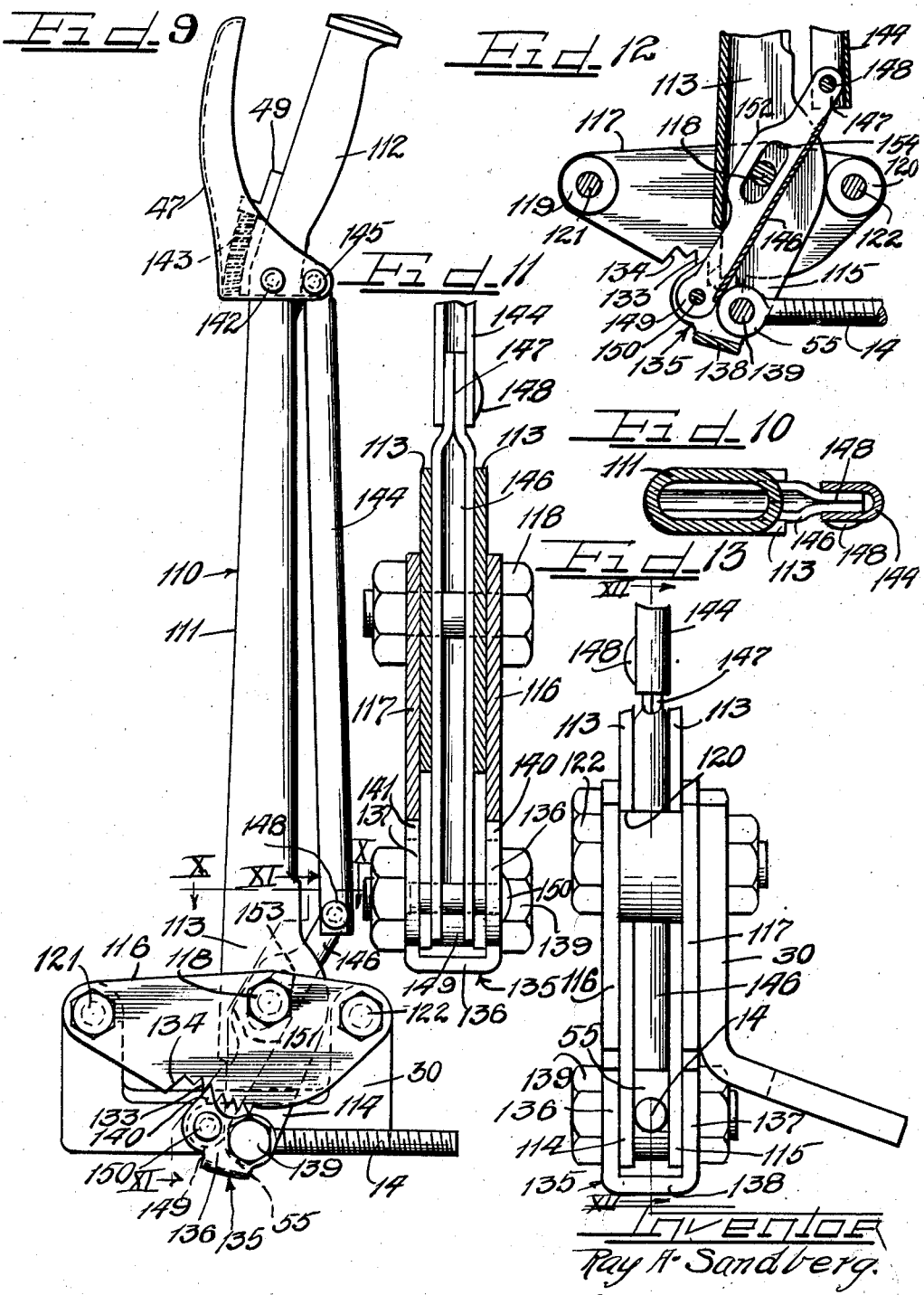

2,351,638

UNITED STATES PATENT OFFICE 2,351,638

BRAKE LEVER

Ray A. Sandberg, Waukegan, Ill., assignor to Houdaille-Hershey Corporation, Detroit, Mich., a corporation of Michigan Application August 14, 1941, Serial No. 406,766

13 Claims. (Cl. 74—537)

The present invention relates to lever mechanisms and is more particularly directed to a brake operating device for vehicles.

Generally, this invention includes spaced ratchet plates between which is pivotally connected a tubular lever. The lever extends entirely through and beyond the ratchet plates to pivotally receive a pawl construction in straddling relation on an end thereof. The pawl construction provides spaced sidewall portions each having a tooth for engagement with ratchet teeth on the ratchet plates.

An actuating rod construction, either extending through or alongside the tubular lever, is pivotally connected to the pawl construction for moving it into and out of engagement with the ratchet teeth on the ratchet plates.

A member, arranged for connection to a brake rod, is carried by the pivot connecting the pawl construction to the lever whereby the vehicle brakes are actuated as the lever is swung on its pivot. This member may either be a clevis straddling the pawl construction and connected to the lever by the pivot between the lever and pawl construction or by a bolt having an eyelet and carried by the pivot between the sidewall portions of the pawl construction.

The actuating rod construction may be arranged for connection to the pawl construction on either side of the pivot connecting the pawl construction to the lever. When the actuating rod construction is on one side of the pivot, the pawl construction is moved out of cooperation with the ratchet plates by a pull on the rod and, when on the other side of the pivot, the pawl construction is moved out of cooperation with the ratchet plates by a pushing action on the rod.

The type of actuating handle construction provided on an end of the lever opposite the end that carries the pawl, will then depend on which side of the pivot, connecting the pawl construction and lever, the actuating rod construction is connected.

An important object of this invention is the provision of a self-contained lever mechanism unit which is simple in construction, rugged and reliable in use, and which may be readily applied to a support in an operative position.

A further object of this invention is to provide a novel brake lever mechanism of the twin ratchet plate and twin pawl type.

A still further object of the present invention in the provision of a novel lever mechanism having spaced ratchet plates pivotally supporting a lever therebetween with a pawl construction pivoted to the lever for cooperating with the spaced ratchet plates.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a side view in elevation of a brake lever mechanism constructed in accordance with the principles of the present invention;

Figure 2 is a side view, with parts in vertical cross-section and other parts broken away, showing a modified form of brake lever construction;

Figure 3 is an enlarged transverse cross-sectional view, with parts in elevation, of the brake lever shown in Figure 1 and as seen in the plane taken substantially along the line III—III thereof;

Figure 4 is an enlarged fragmentary end view of the brake lever shown in Figure 1 as seen in the plane taken substantially along the line IV—IV thereof;

Figure 5 is an enlarged transverse cross-sectional view, with parts in elevation, as seen in the plane taken substantially along the line V—V of Figure 1;

Figure 6 is an enlarged transverse cross-sectional view, with parts in elevation, as seen on the plane taken substantially along the line VI—VI of Figure 2;

Figure 7 is an enlarged fragmentary view in vertical cross-section, with parts in elevation, as seen in the plane taken substantially along the line VII—VII of Figure 2;

Figure 8 is an enlarged fragmentary view in vertical cross-section, with parts in elevation, as seen in the plane taken substantially along the line VIII—VIII of Figure 2;

Figure 9 is a view somewhat similar to Figures 1 and 2 illustrating a further modified form of construction embodying principles of this invention;

Figure 10 is an enlarged transverse cross-sectional view, with parts in elevation, as seen in the plane taken substantially along the line X—X of Figure 9;

Figure 11 is an enlarged fragmentary vertical cross-sectional view, with parts in elevation, as seen when taken in the plane substantially along the line XI—XI of Figure 9;

Figure 12 is a fragmentary vertical cross-sectional view, with parts in elevation, of the lower portion of the lever construction illustrated in Figure 9; and, Figure 13 is a fragmentary end view in elevation, as seen from the right of the lower portion of the lever construction illustrated in Figure 9.

The brake lever construction illustrated in Figure 1 includes a lever 10, a ratchet supporting mechanism 11, straddling and pivotally connected to an intermediate portion of the lever adjacent one end thereof, a pawl mechanism 12, a release mechanism 13, and means 14 for connecting the lever and a mechanism, such as vehicle brakes (not shown), to be actuated.

The lever 10 has a tubular body portion 15 terminating at one end in a hand grip 16 and at its other end in a U-shaped portion 17.

As best shown in Figures 3, 4, and 5, the U-shaped portion 17 provides spaced side walls 18 and 19 connected together by a web 20 which extends along the body portion 15.

The actuating handle grip 16 may be of any shape and is shown as being tubular with the free end thereof covered by a cap member 21.

The ratchet supporting mechanism 11 comprises a pair of plates 22 and 23 having a plurality of aligned apertures adjacent their upper edges for a purpose to be more apparent from the following description. The plates 22 and 23 are held in spaced relation by the apertured spacer members 24 and 25. Bolts 26 and 27 extend through the aligned apertures at the ends of the plates and through the spacers 24 and 25. The shanks of the bolts also extend through end flanges 28 and 29 of a supporting bracket member 30. Nuts 31 and 32 are threaded to the shanks of the bolts whereby the plates 22 and 23 are connected to the bracket in spaced relation. If desired, rivets or the like may be used in the place of the connecting bolt and nut assemblies.

The bracket 30 is so shaped that it may be readily connected to a vehicle for placing the brake lever construction in a proper operative position. A cut out portion 30a provides clearance for the lever mechanism as it swings between the ratchet plates 22 and 23.

The spacers 24 and 25 are slightly longer than the distance between the outer surfaces of the lever legs 18 and 19, in order that the lever may be rockably pivoted to the plates 22 and 23 as shown. The U-shaped portion 17 of the lever 10 is straddled by the plates 22 and 23. A pivot, such as a bolt 33 or the like, passes through aligned openings in the plate and the lever legs 18 and 19. A nut 34 is threaded to the bolt and maintains the lever in its pivotally connected position. A spacer 35 receives the shank of the bolt 33 therethrough and is inserted between the lever legs 18 and 19 to maintain them in their proper spaced relation.

It is to be noted that the provision of spaced plates, such as plates 22 and 23, eliminate the need of providing any cut-out portions in the lever as is customary in the usual lever constructions including but one supporting plate which the lever straddles. In the usual construction, the lever is provided with spaced legs which straddle and are pivotally connected to a sector or supporting plate. This construction necessitates reinforcing the lever legs by embossing them or by welding additional plates along the sides thereof.

In the present invention, the cross-sectional shape of the lever may be retained to the end thereof thereby retaining the strength due to the lever shape at the portion which is pivotally connected to the supporting plates.

As best shown in Figure 1, the lower edges of the supporting plates 22 and 23 have aligned ratchet teeth 36 formed thereon. A stop shoulder 37 is also formed at the end of the ratchet teeth on each of the plates 22 and 23.

The pawl mechanism 12 is U-shaped in cross section as seen in Figure 4. This construction provides spaced side-walls 38 and 39 connected by a web 40. Both side-walls of the pawl mechanism are shaped alike as shown particularly in Figure 5.

As best shown in Figures 1 and 5, the side-wall 38 has a forwardly extending portion 41 shaped along its upper edge to provide a tooth 42. Likewise, the pawl side-wall portion 39 has a forwardly extending portion 43 with a tooth 44 on the top edge thereof. It will be noted in Figure 4 that the side-wall portions 38 and 39 have the same spaced relation as the plates 22 and 23 in order that the pawl teeth 42 and 44 may cooperate with the ratchet teeth 36 on the plates. The U-shaped pawl straddles the end of the lever 10 and is pivotally connected thereto by means of a pivot member 45. A cotter pin 46 is inserted through an aperture in the shank of the pivot pin 45 for retaining the latter in its proper position.

The pawl mechanism 12 is actuated into and out of engagement with the ratchet plates 22 and 23 by means of the release mechanism 13. This mechanism includes an L-shaped handle 47 which straddles the lever 10 adjacent the inner end of the hand grip 16 and is connected thereto by means of a pivot pin 48. A clip member 49 is carried by the hand grip 16. One end of a coil spring 50 is carried by the clip 49 and its other end is positioned at the junction of the legs of the L-shaped handle 47 for maintaining the handle in a projected operative position.

A transversely extending pin 51 is carried by the lower legs of the handle 47 and extends through aligned elongated openings 52 in the side-walls of the lever. This permits the handle 47 to be rocked toward the grip 16 on the pivot 48 and to move the pin 51 in a vertical direction.

A pawl actuating rod 53 is shaped at both ends thereof to provide eyelets 54 and 55. The eyelet 54 receives therethrough the transversely extending pin 51 to pull the rod upwardly when the release handle 47 is actuated toward the grip 16. A portion 56 of the rod 53 is offset so as to pass around the spacer 35 carried by the lever pivot 33. The eyelet end 55 receives therethrough a pivot 57, such as a rivet or the like, carried by the pawl side-walls 38 and 39.

When the release handle 47 is actuated toward the lever grip 16 the release rod 53 will be pulled upwardly and the pawl mechanism 12 will be rotated on its pivot 45 to a position in which the pawl teeth 42 and 44 are no longer in cooperation with the ratchet teeth 36 on the ratchet plates 22 and 23. As soon as the grip on the release handle 47 is released, the coil spring 50 serves to urge the release handle in a projected position (Figure 1) and the release rod 53 is thereby moved downwardly to rock the pawl on its pivot and the pawl teeth into engagement with the nearest ratchet teeth on the plates 22 and 23. This cooperation between the pawl and the ratchet plates maintains the lever 10 in an adjusted position.

In the usual brake lever constructions, a clevis member is connected to the lever in straddling relation thereto by means of a pivot. Such a clevis member will be described more fully hereinafter with a modified form of construction illustrated in Figure 2. It is to be understood that the use of such a clevis member is possible in the lever construction of Figure 1 by straddling the pawl mechanism 12 and being carried by the pivot pin 45. When so used, the web 20 of the lever may extend entirely to the end of the lever to which the straddling pawl is pivotally connected.

However, in the lever construction illustrated in Figure 1 and now being described, connecting means 14 for a brake actuating rod or other actuating mechanism is shown as being a threaded member having an eyelet end 58. As shown in Figure 5, the eyelet end 58 is substantially of the same width as the space between the lever legs 18 and 19 and carried by the pivot 45 connecting the pawl 12 to the lever. The threaded end of the member 14 is threadedly connected to a brake actuating rod or cable in a well known manner (not shown).

It is necessary to provide clearance between the end of the web 20 on the lever 10 and the member 14 as the latter rocks on its pivot during swinging movement of the lever. This clearance is provided by terminating the end of the web 20 at a point substantially as indicated at 59.

As the lever 10 is swung on its pivot 33, the vehicle brakes are actuated or released through substantial endwise movement of the member 14. The lever 10 is swung to the left for actuating brakes or other mechanisms and to the right for releasing them. It is to be noted that the forward portions of the pawl teeth 42 and 44 engage against the stops 37, 37 to limit movement of the lever in a releasing direction. No stops are provided in the actuating direction as wear on the brakes necessitates a greater lever-swing for moving them into holding engagement with their brake drums.

As shown in Figure 1, the eyelet end 55 of the actuating rod 53 is pivotally connected to the pawl 12 at the right hand side of the pawl pivot 45. This requires that the upper handle end construction be such that the rod is lifted for moving the pawl out of engagement with the spaced ratchet plates 22 and 23. While a particular type of lever grip and release has been illustrated and described, it is to be understood that any handle construction which, when actuated, raises the rod 53 will come within the scope of the present invention.

It will be apparent from the foregoing that the present lever construction offers numerous advantages not to be found in the usual lever constructions. For instance, the present lever mechanism provides a lever that retains all of the strength due to its cross-sectional shape by being pivoted to and between spaced supporting members rather than straddling a single supporting member. This eliminates the need, as in conventional levers, of providing additional strength by embossing or by welding reinforcing plates to the bifurcated portion of the lever which is pivotally connected to a support.

Furthermore, by providing sector plates which straddle the lever, the plates may be stamped of material of thin gauge which together are as strong as a single sector plate of twice the thickness mounted between spaced lever legs as in the usual construction. The present invention also offers the advantage of permitting changes in gauge of the sector material without involving any extreme die costs or of necessitating radical changes in the lever construction. This is due to the lack of interference when the gauge is changed on externally mounted sector plates which is not possible where the sector plate is mounted between spaced lever legs.

A modified form of construction is illustrated in Figure 2. This brake lever construction is much the same as that illustrated in Figure 1 with several notable exceptions. A lever 65 has a tubular body portion 66 terminating at one end in a tubular grip 67 and at its other end in a U-shaped portion 68.

Ratchet plates 69 and 70 are connected to the supporting bracket 30 at the end flanges 28 and 29 thereof by means of bolt assemblies 71 and 72. As shown in Figure 6, the ratchet plate 69 is flat while the ratchet plate 70 has a U-shaped portion 73 intermediate its ends with longitudinally extending end flanges 74 and 75. The U-shaped portion 73 is of sufficient depth to rockably include therebetween the U-shaped end 68 of the lever when the ratchet plates are connected to the support bracket 30 in the manner as shown.

The U-shaped lever end 68 includes spaced side-walls 76 and 77 having a web 78 therebetween. It is to be noted that the web 78 is formed by the inturned marginal edges along the longitudinal seam of the lever.

Aligned openings through the ratchet plates 69 and 70 and the lever legs 76 and 77 receive therethrough a pivot such as a bolt assembly 79. A hollow spacer 80 receives the shank of the pivot bolt therethrough and is inserted between the lever legs 76 and 77 to keep them in proper spaced relation.

The lower edges of the ratchet plates 69 and 70 have aligned ratchet teeth 81 and stop shoulders 82 formed thereon.

A pawl mechanism 83 includes a pair of members 84 and 85 which are maintained in proper spaced relation by straddling the lever legs 76 and 77. A spacer 86 between the lever legs maintains them in proper spaced relation. A clevis 87, having spaced legs 88 and 89, straddles the lever legs 76 and 77. Aligned openings are then provided whereby a pivot pin 90 is inserted through the clevis, the pawl members, the ends of the lever legs 76 and 77, and the inserted spacer 86. A cotter pin 91 or the like is then inserted through a suitable aperture in the shank of the pivot 90 for retaining the members in their proper relation. This assembly provides pawl members on the outside of the lever legs in alignment with the ratchet portions of the plates 69 and 70.

As shown in Figures 2 and 8, the pawl member 85 has a ratchet tooth 92 formed on the upper edge thereof for engagement with the ratchet teeth 81 on the plate 70. Likewise, the pawl member 84 has a tooth 93 provided on the upper edge thereof for engagement with the ratchet teeth 81 on the plate 69. The cooperation of the pawl and the ratchet teeth maintains the lever 65 in an adjusted position.

The forward ends of the pawl members 84 and 85, that is as seen on the lefthand side of the pivot 90, are provided with registered openings for receiving therethrough a flat-head pivot pin 94. One end of the pin 94 is provided with a flat head 95 and its other end is threaded as at 96. The flat head 95 is shown (Figure 8) as being seated in the pawl member 84 with the threaded end 96 being threaded into the pawl member 85 and terminating flush with the outside face thereof. It is to be understood, however, that the position of the pin may be reversed relative to the pawl members 84 and 85. It is important that the ends of the pivot pin 94 lie flush with the outside surfaces of both the pawl members 84 and 85 to eliminate any interference by the straddling clevis member 87. Furthermore, the pivot pin 94 may, if desired, be a flat-head rivet with a flat head at each end seated in the pawl members 84 and 85. It is preferred, however, that the pivot pin be threaded into one of the pawl members as described in order that the pawl mechanism be easily disassembled.

A pawl actuating rod 97 has one end thereof formed as an eyelet 98 for receiving therethrough the pivot pin 94. The actuating rod extends upwardly through the hollow lever body portion 66 and terminates adjacent the upper end of the lever grip 67 as at 99.

An annular groove 100 is formed on the inner periphery of the lever at one end of the handle grip 67 to receive therein an apertured abutment member 101. The pawl actuating rod 97 extends through the abutment member 101 and has an actuating button 102 connected to its end 99. The actuating button 102 has an extending portion 103 slidably seated within the end of the hand grip 67. A coil spring 104 embraces the actuating rod 97 and is seated at one end on the abutment 101 and at its other end against the portion 103 of the button 102. This spring maintains the actuating button in a projected operative position and holds the pawl members 84 and 85 in toothed engagement with the ratchet plates 69 and 70. Thumb pressure exerted on the button 102 serves to move the actuating rod 97 in a downward direction thereby disengaging the teeth of the pawl portions 84 and 85 from engagement with the ratchet teeth on the plates 69 and 70. Release of thumb pressure on the button permits the coil spring 104 to move the actuating rod 97 in an upward direction and the teeth of the pawl portions 84 and 85 into toothed engagement with the ratchet plates. This toothed engagement serves to hold the lever in an adjusted position.

It is to be noted that the forward edges of the pawl portions forming the teeth 92 and 93 abut against the stops 82 on the ratchet plates when the lever has been moved to the right to define the swinging limit thereof. The stops 82 limit movement of the lever in a releasing direction but no stops are provided to limit movement of the lever in the opposite or actuating direction for, when the lever is connected to brake mechanisms, wear on the brakes will necessitate a greater swing of the lever to actuate them to holding positions.

The clevis member 87 is connected to the vehicle brakes by means of an actuating rod 105 one end of which is threadedly connected to the clevis by its threaded end 106.

It is to be further noted in the modified construction illustrated in Figure 2 that the pawl actuating rod 97 is connected to the pawl members 84 and 85 at the left of the pawl pivot 90. Release of the pawl mechanism requires that the actuating rod be moved in a downward direction. Consequently, a handle end construction of the type shown at the top of Figure 2 has been provided. It is to be understood, however, that any actuating mechanism for urging the rod 97 in a downward direction to release the lever may be used with the modified lever construction of Figure 2.

The lever constructions of Figures 1 and 2 differ over each other in the direction in which the pawl actuating rod is moved for actuating the pawl into and out of engagement with the ratchet teeth. In addition, Figure 1 illustrates the use of a threaded connecting member having an eyelet end for connecting the actuating lever and a mechanism to be actuated, such as vehicle brakes. In Figure 2, a clevis member is illustrated for connecting the brake lever to the actuating rod for the vehicle brakes. It is to be understood however, that the eyelet bolt or the clevis may be used with either of the lever constructions shown.

Another modified form of brake lever construction is illustrated in Figure 9. This construction includes a lever 110 having a tubular body 111 terminating at one end in a hand grip 112 and at its other end in a U-shaped portion 113 and spaced legs 114 and 115.

The U-shaped portion 113 is pivotally connected to and between the ratchet plates 116 and 117 by means of a pivot 118. Apertured spacers 119 and 120 maintain the ratchet plates in proper spaced relation. Bolt and nut assemblies 121 and 122 extend through and connect the ratchet plates and their spacers to a bracket 30 in a manner similar to the constructions illustrated in Figures 1 and 3.

Aligned ratchet teeth 133 and stop shoulders 134 are provided on adjacent lower edges of the plates 116 and 117.

A U-shaped pawl 135, having side-walls 136 and 137 connected by a web 138, is pivoted to the lever legs 114 and 115 in straddling relation by means of a pivot member 139. A pawl tooth 140 is formed on the upper edge of the pawl side-wall 136 and a tooth 141 is formed on the upper edge of the pawl side-wall 137. The side-walls are in alignment with the ratchet plates in order that their teeth may engage for holding the lever in an adjusted position.

A threaded bolt 14 having an eyelet end 55, of the same construction as shown in Figure 1, is carried by the pivot 139 between the lever legs 114 and 115 and connects the lever to a mechanism such as vehicle brakes.

The pawl teeth 140 and 141 engage the stops 134, 134 for limiting swinging movement of the lever to the right as viewed in Figure 9.

At the upper end of the lever 110 is a release mechanism comprising an L-shaped handle 47 having a bifurcated end straddling and pivoted to the lever along its longitudinal axis and adjacent the hand grip 112 by means of a pivot pin 142. A clip 49 is carried by the grip 112 and holds one end of a coil spring 143 thereon with its other end engaging the juncture of the legs defining the L-shape on the handle. The spring serves to normally hold the handle 47 in spaced relation from the grip 112.

A long channel-shaped member 144 is pivotally connected at its upper end to the bifurcated end of the handle 47 by means of a rivet 145. The member 144 extends downwardly along side the lever body 111 and terminates adjacent the juncture of the lever body and the U-shaped portion 113.

A shorter channel-shaped member 146 has one end 147 formed by the ends of the side-walls being inturned into face engagement as shown in Figure 11. A pivot, such as a rivet 148, connects the lower end of the channel-shaped member 144 to the end 147 of the short channel-shaped member 146 as shown in Figures 10, 11 and 12. The other end 149 of the member 146 is pivoted to and between the pawl sidewalls 136 and 137 by means of a pivot 150, such as a rivet or the like.

It is to be noted that the member 146 extends diagonally across the lower end of the lever between the side-walls 114 and 115.

An intermediate portion of the member 146 has enlarged side-wall portions 151 and 152 which have aligned elongated slots 153 and 154 therein. The lever pivot 118 extends through the slots 153 and 154 to guide the member 146 and limit its endwise movement.

When the lever handle 47 is squeezed by an operator toward the grip 112, the long channel-shaped member 144 is pushed downwardly. This action pushes the short channel-shaped member 146 diagonally downward to push the pawl 135 out of toothed engagement with the ratchet teeth 133. The lever 110 is thereby released for free movement on its pivot 118.

Release by the operator of the handle 47 permits the coil spring 143 to urge it away from the grip 112 and thereby raise the channel-shaped members 144 and 146. This movement pulls the pawl 135 into toothed engagement with the ratchet teeth 133 to hold the lever in an adjusted position.

Rocking movement of the lever on its pivot 118 serves to actuate or release a mechanism, such as vehicle brakes, to which it is connected.

While the threaded eyelet member 14 is shown in combination with the pawl of Figure 9, it is apparent that the clevis 87 illustrated in Figure 2 may also be used.

The lever construction of Figure 9 differs over those of Figures 1 and 2 by the upper lever end construction and a different release mechanism extending along the outside of the lever instead of within the lever. The release mechanism is arranged with an actuating handle of the type shown in Figure 1 but the pawl is released by downward movement of the channel-shaped members rather than an upward movement of the rod of Figure 1.

It is apparent from the foregoing that I have provided brake lever constructions which are straddled by ratchet supporting members and which carry on one end thereof a pawl mechanism having spaced toothed portions for coacting with the ratchet supporting members. These constructions permit the use of an actuating handle mechanism which will actuate the pawl release rod vertically in a direction for releasing the pawl mechanism from its engagement with the ratchet members, which direction depends on the side of the pawl pivot that the release rod is connected to the pawl mechanism and on the type of actuating handle mechanism used. Furthermore, these constructions permit the use of two different members, a clevis or a threaded bolt having an eyelet end, for connecting the actuating lever with the rod or cable connected to the vehicle brakes.

While particular embodiments only of this invention have been illustrated, it will, of course, be understood that the invention should not be limited thereto, since many other modifications may be made and, therefore, it is contemplated by the appended claims to cover all such modifications as fall within the true spirit and scope of the present invention.

I claim as my invention:

1. A lever construction comprising spaced plate members arranged for connection to a support, ratchet teeth on adjacent edges of said plate members, a tubular lever having a U-shaped end portion pivotally connected to and extending between said plate members and terminating in spaced relation from said ratchet teeth, a U-shaped pawl straddling the terminal of the U-shaped portion on said lever and having teeth engageable with said ratchet teeth for holding said lever in an adjusted position, and an actuating rod extending within said tubular lever and being connected to said U-shaped pawl for moving it into and out of toothed engagement with the ratchet teeth on said plate members.

2. A lever construction comprising spaced plate members arranged for connection to a support, ratchet teeth on adjacent edges of said plate members, a tubular lever having a U-shaped end portion pivotally connected to and extending between said plate members and terminating in spaced relation from said ratchet teeth, spaced pawl members pivoted to the terminal of the U-shaped end portion on said lever, means connecting said pawl members for co-movement, teeth on said spaced pawl members engageable with said ratchet teeth for holding said lever in an adjusted position, and an actuating mechanism connected to said connecting means for moving said pawl members into and out of toothed engagement with the ratchet teeth on said plate members.

3. A brake lever construction comprising spaced plate members arranged for connection to a support, ratchet teeth on adjacent edges of said plate members, a tubular lever having a U-shaped portion at one end thereof pivotally connected to and extending between and beyond said plate members in spaced relation from said ratchet teeth, a pawl construction having spaced toothed members connected together for co-movement, a pivot connecting said pawl construction in straddling relation to the end of the lever spaced from said ratchet teeth whereby said pawl construction engages with said ratchet teeth to hold said lever in an adjusted position, a brake actuating member carried by said pivot adjacent the spaced members of said pawl construction, and an actuating rod extending within said tubular lever and connected to said pawl construction for moving the latter into and out of engagement with said ratchet teeth.

4. A brake lever construction comprising a support mechanism having ratchet teeth thereon, a lever pivoted to said support mechanism, a pawl construction having spaced toothed members pivoted to said lever for cooperation with the ratchet teeth for holding said lever in an adjusted position, a threaded brake actuating member having an eyelet co-supported with and between said spaced toothed members on said lever, and means for actuating the spaced toothed members of said pawl construction into and out of cooperation with said ratchet teeth.

5. A brake lever construction comprising spaced plate members having ratchet teeth thereon, a lever extending between and terminating beyond said plate members and being pivotally connected thereto, a pawl construction having spaced toothed members pivoted to the end of the lever extending beyond said plate members and arranged for cooperation with said ratchet teeth for holding said lever in an adjusted position, a clevis brake actuating member straddling the toothed members of said pawl construction and being co-supported therewith on said lever, and means for actuating the toothed members of said pawl construction into and out of cooperation with said ratchet teeth.

6. A brake lever construction comprising plate members having ratchet teeth along adjacent edges thereof, spacers holding said plate members in spaced relation, means connecting said spaced plate members to a support, a tubular lever having a hand grip at one end and a U-shaped portion at the other end thereof, a pivot connecting said U-shaped portion to and between said spaced plate members, a U-shaped pawl having spaced sidewalls with teeth at one end thereof and a connecting web, a pivot connecting said pawl intermediate the ends thereof to the end of said U-shaped portion on the lever in straddling relation thereto, said toothed sidewalls being in alignment for cooperation with said ratchet teeth, a brake actuating member having a threaded portion and an eyelet at an end thereof, said eyelet being carried between the sidewalls of said pawl by the pivot connecting said pawl to said lever, an actuating rod pivoted to said pawl at its end opposite the toothed end thereof, said actuating rod extending within said tubular lever, and means on said lever adjacent the grip thereof for actuating said rod whereby said pawl is moved into and out of engagement with said ratchet teeth.

7. A brake lever construction comprising plate members having ratchet teeth along adjacent edges thereof, a U-shaped portion on and intermediate the ends of one of said plate members, means connecting said plate members to a support, a tubular lever having a hand grip at one end and a U-shaped portion at the other end thereof, a first pivot connecting said U-shaped portion of said lever to and between said plate members within said plate member U-shaped portion, a pawl having members with teeth on adjacent ends thereof, a spacer within the U-shaped portion of said lever, a second pivot connecting said pawl members and the U-shaped portion of said lever, a brake actuating clevis straddling said pawl members and carried by said second pivot, a third pivot carried by said pawl members at their toothed ends and adjacent said second pivot, a pawl actuating rod connected to said third pivot and extending within said tubular lever, and means carried by the hand grip of said lever for actuating said rod whereby said pawl members are moved into and out of engagement with said ratchet teeth.

8. A lever construction comprising spaced ratchet members, a lever between said members, a pivot connecting said lever to said members, a pawl on said lever movable into engagement with said ratchet members for holding said lever in an adjusted position, and a release mechanism for moving said pawl into and out of engagement with said ratchet members including pivoted members, one of said members having a slot therein for receiving said pivot therethrough, said pivot guiding and limiting the movement of said one member during movement of said pawl.

9. A lever construction comprising spaced ratchet members, a lever having spaced wall portions at one end and a hand grip at its other end, a pivot connecting said spaced wall portions to and between said ratchet members, a pawl construction having portions straddling said lever and being pivoted thereto for engagement with said ratchet members to hold said lever in an adjusted position, a release handle adjacent the grip of said lever, a spring normally maintaining said handle spaced from said grip, a channel-shaped push member pivotally connected to said handle, a second channel-shaped member pivotally connected to said first channel-shaped member and to said pawl, said second channel-shaped member having aligned elongated slots in the sidewalls thereof intermediate its ends for receiving said lever pivot therethrough, said pivot and slots coacting to guide and limit movement of said second channel member when said handle is actuated for moving said pawl into and out of engagement with said ratchet members.

10. A lever construction comprising a ratchet support, a lever, a pivot connecting said lever to said support, cooperating clutching members for holding said lever in an adjusted position, a release construction for actuating said clutching members into and out of cooperation with each other, said release construction including a member extending along said lever and another member pivoted to said first member and extending diagonally across said lever into connection with one of said clutching members, and means coacting with one of said members for guiding and limiting movements of both members when said release construction is actuated for moving said one clutching member into and out of cooperation with the other clutching member.

11. In a lever mechanism for actuating an associated device, a clutching construction comprising a plurality of spaced toothed members, one group of said spaced members being movable by said lever mechanism into and out of toothed engagement with another group of said members, and an actuated member pivotally carried by and between adjacent members of said one group of spaced members for actuating said associated device.

12. A clutching construction comprising a pair of spaced toothed members, a second pair of spaced toothed members, one pair of said members being shiftable along the other pair of spaced members and movable into locking engagement therewith, a pivot connecting said one pair of spaced members, and a threaded member having an eyelet end carried by said pivot between the spaced members of said one pair.

13. A clutching construction comprising a pair of spaced toothed ratchet plates fixedly mounted on a support, a pair of pawl members connected for co-movement and mounted for movement along said ratchet plates and into toothed engagement therewith, and a threaded member having an eyelet end pivoted to and between said pawl members.

RAY A. SANDBERG.